April 19, 1949.　　　O. M. HARLOW　　　2,467,888
APPARATUS FOR WASHING PLANT PRODUCTS
Filed Jan. 15, 1944　　　　　　　　　　　　　　　5 Sheets-Sheet 1

INVENTOR
Orman M. Harlow
BY
his ATTORNEY

April 19, 1949.    O. M. HARLOW    2,467,888
APPARATUS FOR WASHING PLANT PRODUCTS
Filed Jan. 15, 1944    5 Sheets-Sheet 2
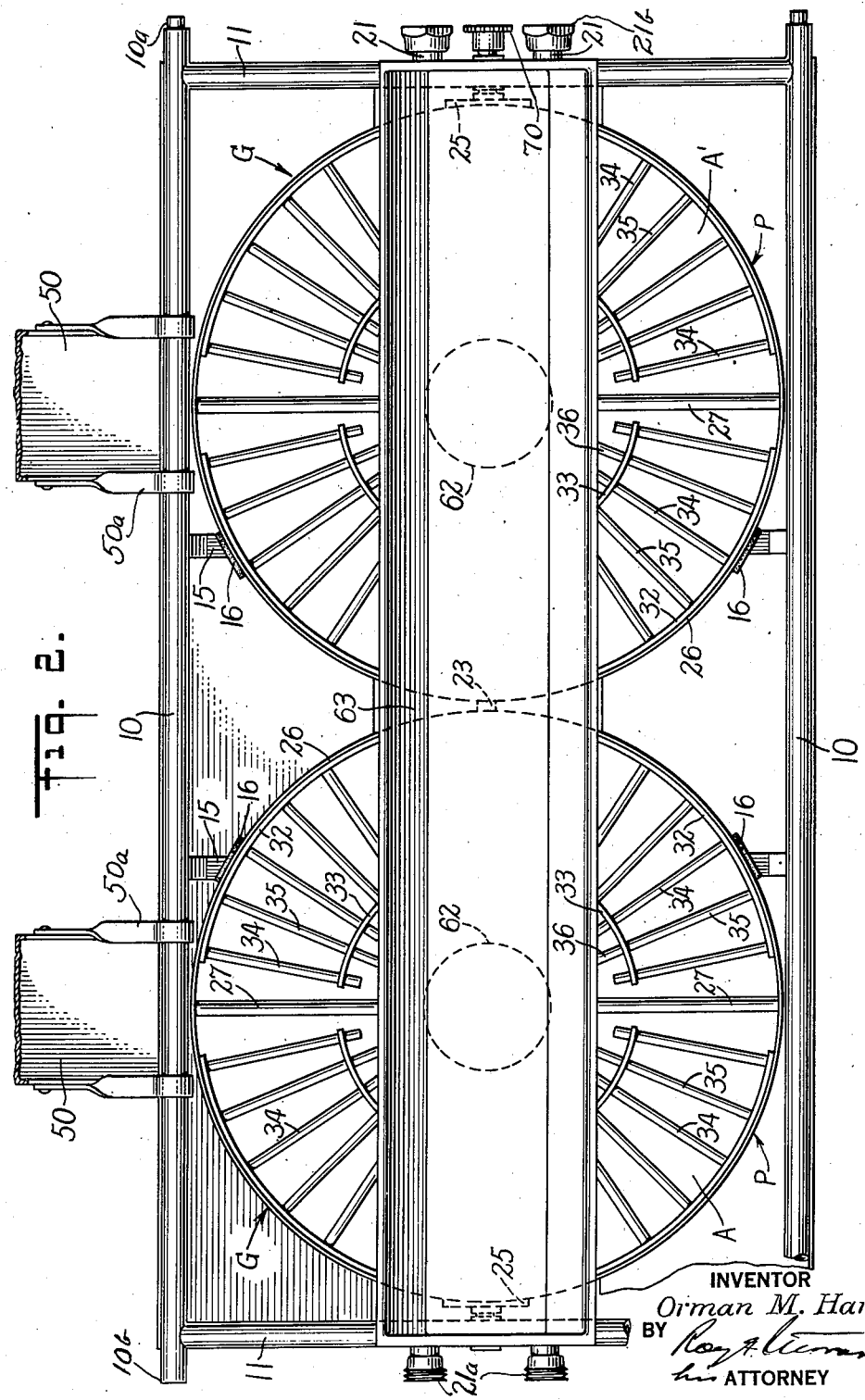
INVENTOR
Orman M. Harlow
BY
his ATTORNEY

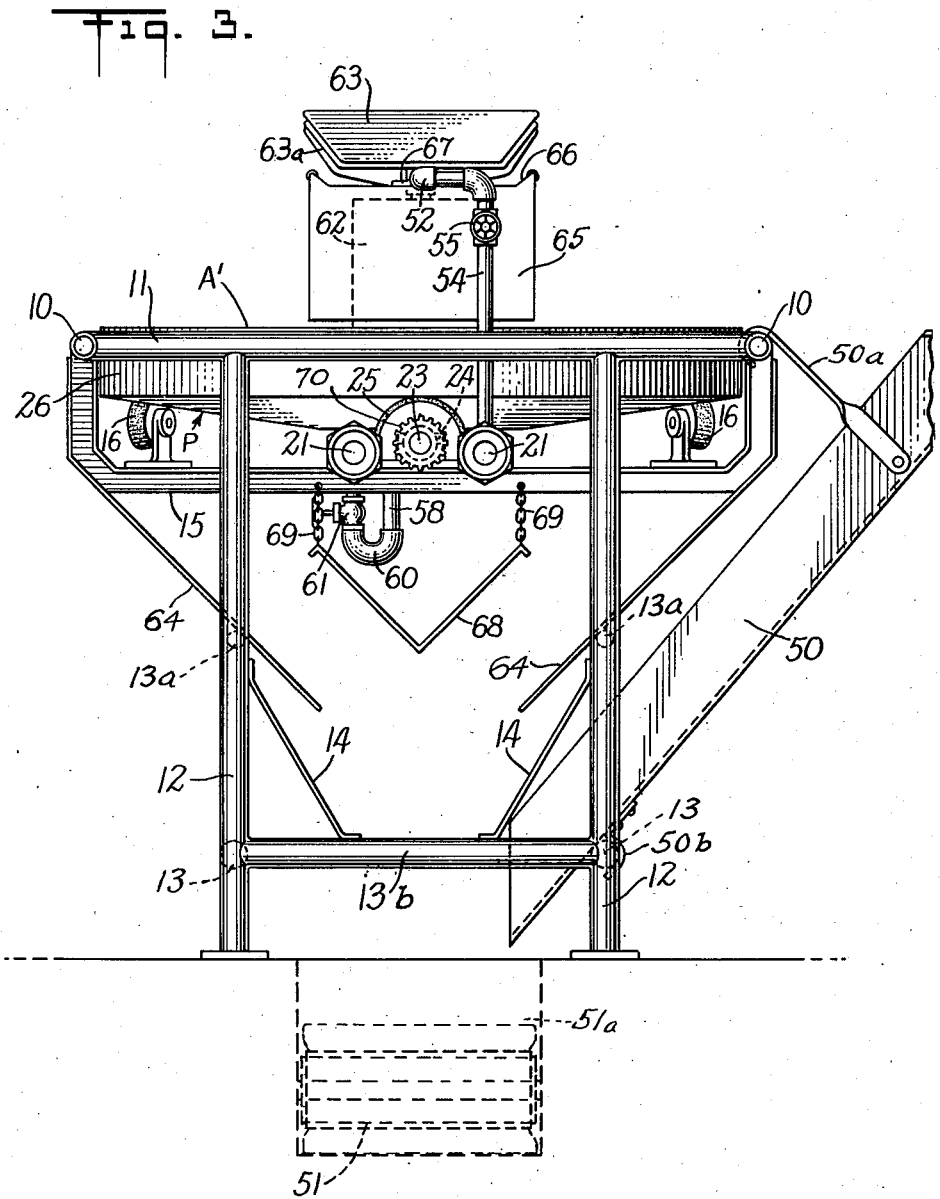

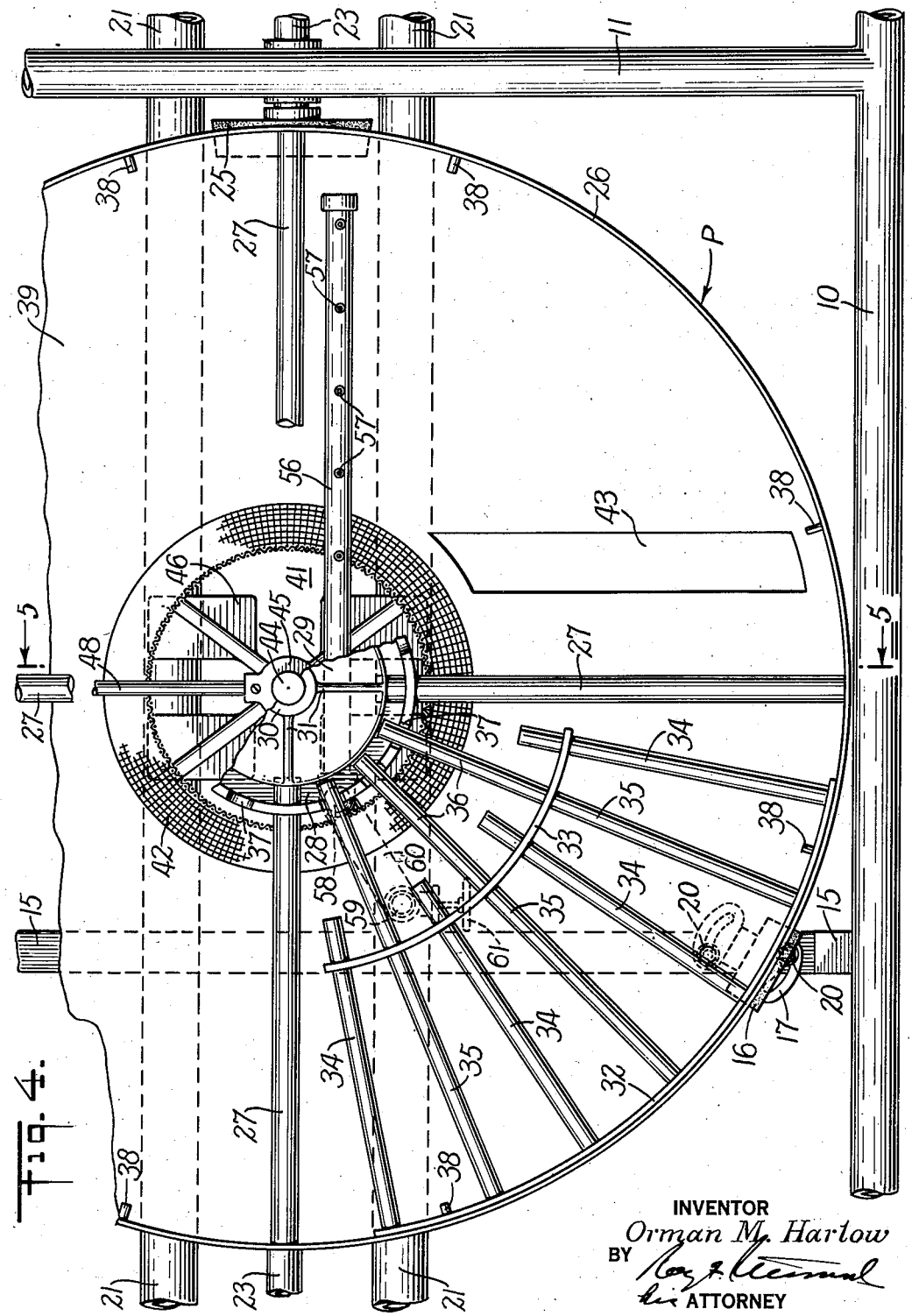

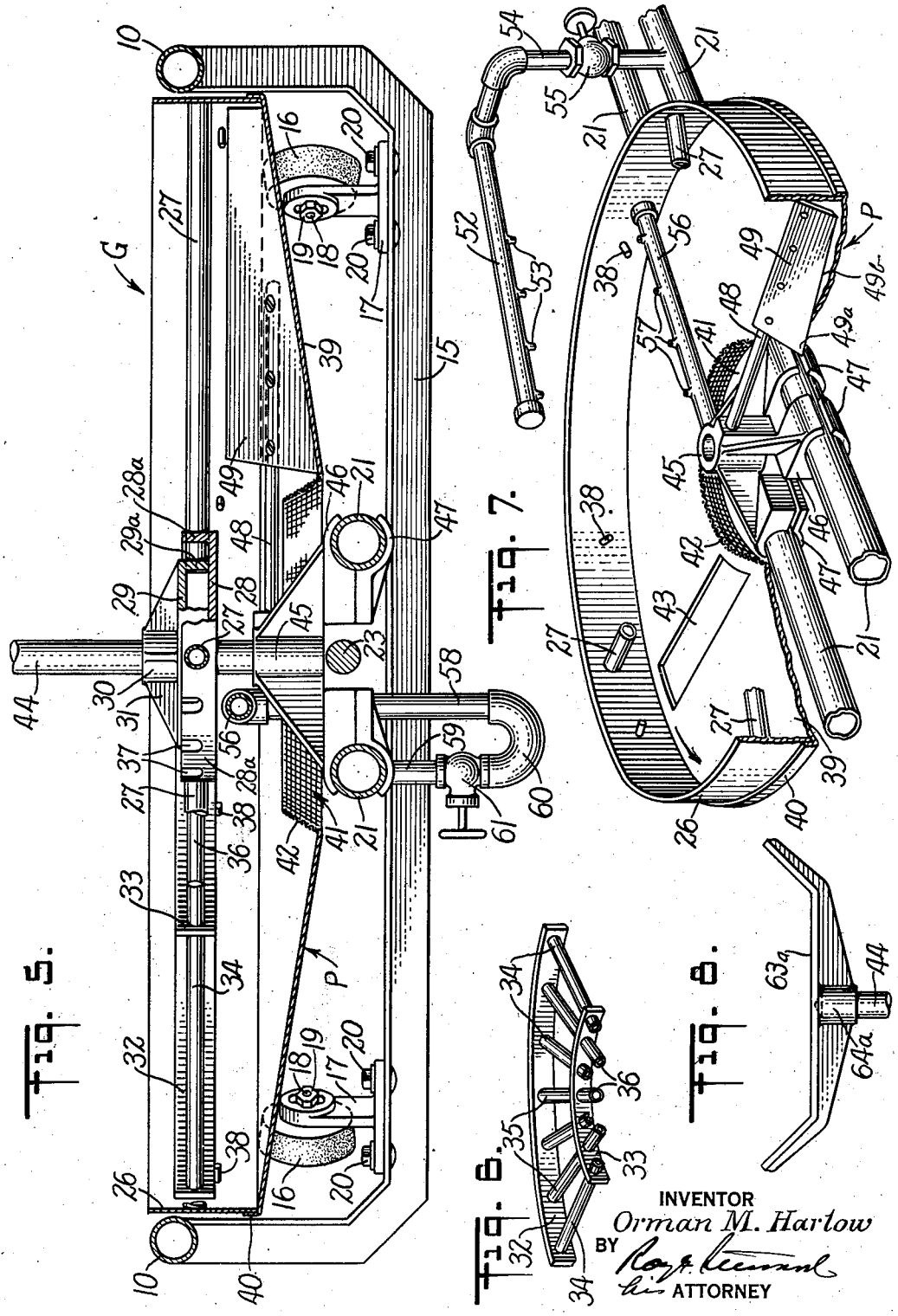

Patented Apr. 19, 1949

2,467,888

UNITED STATES PATENT OFFICE 2,467,888

APPARATUS FOR WASHING PLANT PRODUCTS

Orman M. Harlow, Anaheim, Calif., assignor, by mesne assignments, to M. W. Engleman, trustee Application January 15, 1944, Serial No. 518,319

11 Claims. (Cl. 134—86)

This invention relates to apparatus useful in washing and packing vegetable produce; and it relates more particularly to apparatus of the rotary table type for washing and packing lettuce or the like.

While the apparatus of the invention can be employed in the handling of various kinds of produce requiring trimming and rinsing or washing in preparation for packing, its greatest present utility is in the commercial handling of head lettuce in preparing and packing the same for shipment to market. Therefore, in describing hereinafter typical apparatus employing the principles of the invention, reference will be made to apparatus designed for the specific purpose of handling heads of lettuce, it being understood, however, that the invention is not confined to this specific field.

In the commercial preparation of lettuce for packing and shipping, lettuce arriving at the packing house from the field is placed in bins, from which it is taken by the trimmers as the first step in its handling. As placed in the trimmers' bins, the lettuce carries considerable soil; and in the operation of trimming off the coarse outer leaves of the lettuce head, this soil or dirt is to some extent spread over the freshly trimmed heads, which therefore have to be rinsed with light water sprays in order to wash off this loose dirt. The trimmed and rinsed lettuce heads are then selected for size by packers who place them in standard shipping crates usually with some cracked ice.

Various types of rotary table apparatus have been heretofore proposed for washing or rinsing and packing trimmed lettuce in preparing and packing it for market. Such rotary table apparatus serves to convey the trimmed heads of lettuce from the trimmer to the packer, and includes provision for rinsing the lettuce by means of water sprays while it is being so conveyed. The coarse outer leaves trimmed from the lettuce heads before they are placed on the rotary table are thrown into a cull or refuse chute by the trimmer, this chute delivering such refuse by gravity to conveyor means of some kind which carries it to a convenient point of discharge for disposal as waste. But in the further handling of the lettuce after it is trimmed, including its placement on the rotary table, its passage through the water sprays and its handling by the packer in grading it for size, the lettuce in many instances loses some additional leaves before being removed from the table, and the accumulation of this further refuse and the rapid and convenient disposal thereof in proper manner is a problem of some difficulty which has not been solved altogether satisfactorily in apparatus heretofore proposed. One factor contributing to the difficulty of solving the problem is the fact that in a large lettuce packing house employing a considerable number of these rotary table washers, a relatively very large volume of water must be used in the washing operation, and since water is frequently relatively scarce and expensive in some of the lettuce-growing sections where such packing houses are located, it becomes important to clarify and re-circulate the wash water through the spraying system for economic reasons. This means that suitable provision should be made for preventing as far as possible the broken-off leaves and other refuse arising from the handling of the trimmed lettuce heads on the rotary tables from passing off and commingling with the body of wash or rinse water to be re-circulated. This commingling of refuse with the wash water discharged from the tables is further objectionable for other reasons aside from that of complicating water conservation.

It has been proposed heretofore to employ screens or strainers of various kinds and arrangements in the construction of rotary table washers for the purpose of effecting the desired separation of leaves and other trash from the water discharged from the washers. However, such previously proposed constructions suffer from the disadvantage that, at intervals, they become so clogged with loose lettuce leaves and other refuse that the apparatus has to be shut down rather frequently and the refuse removed. Sometimes this refuse accumulates to such an extent and so consolidates in the apparatus that it has to be cut out in order to remove it. Interruptions of operation due to such stoppage of the apparatus not only result in loss due to increased operating cost, but may seriously reduce the output of the packing house.

It is an object of the present invention to provide an apparatus particularly suitable for washing lettuce, cabbage or like produce, that is free from the disadvantages of rotary table washers of the prior art, not likely to be clogged by refuse, and easily kept in clean condition at all times.

Another object of the invention is to provide an apparatus in which the trimmed lettuce heads or the like will be retained on a substantially horizontal supporting portion of the rotary table structure in position convenient for the packers, while refuse incidental to the washing or rinsing operation passes down, together with the wash water, into a depending portion of the table provided with means for retaining such refuse while permitting the water to be discharged, and also having provision for separately discharging the refuse; the table structure as a whole being so mounted and driven as not to interfere with ready access to the foregoing parts.

A further and general object is to provide a rotary table apparatus of the character described which is simple, durable, and economical in both cost of construction as well as operation.

These and other objects of the invention, as well as its novel features and advantages, will become further apparent from the description hereinafter.

Apparatus embodying the invention in its most advantageous form comprises one or more rotary table washing units, each comprising a wheel-like top in the form of a grid or spider of special construction for supporting the lettuce heads or similar produce in their passage through water sprays; a hopper-like pan or tray secured to and depending from the grid top structure, said pan being arranged to receive both the used wash water and also the incidental refuse, such as loose leaves, detached from the lettuce or other produce as it is conveyed by the rotary table from the trimmers to the packers, and for retaining such refuse while permitting the water to be freely discharged; together with means continuously operative to prevent substantial accumulation of refuse in the pan and to cause its discharge therefrom separately from the wash water as the table rotates.

The grid or spider top comprises a plurality of annular sections mounted to provide a substantially horizontal supporting surface for the lettuce heads, said sections being individually removable and each having its supporting surface formed of substantially radial members, such as bars, spaced relatively far apart, yet close enough together to support even the smaller sizes of marketable lettuce heads encountered in practice.

By this particular construction of the grid top, such plant products as lettuce heads are easily moved radially on the rotary top, yet are positively held and carried around in a circular path of travel by the rotation of the top. A further and important advantage of the relatively wide spacing of the radial bars is that although nearly all the refuse, including loose leaves, will drop between the bars and be taken care of automatically by the refuse-removing means hereinafter described, occasional large leaves or other refuse that may be caught and retained by the bars can be easily and quickly removed by the operator manually, as by raking such refuse radially to the margin of the table and thence into a refuse chute or equivalent means, by which it is directed downwardly to a suitable refuse conveyor arranged at a lower level. Such conveyor also receives the refuse that drops between the grid bars down upon the depending portion of the table and is discharged therefrom as will later appear. Furthermore, by the arrangement of the grid top in sections, these sections may be easily and quickly lifted off to permit access to said depending portion or tray beneath, for purpose of cleaning the same at any time when the table is not in operation. Said sections are not locked or fastened to the tray by any securing devices, but are properly held against movement laterally, as will be clear from the detailed description hereinafter.

The aforesaid tray or depending portion of the table below the rotary grid top or turn-table takes the form, most desirably, of a downwardly coned pan or hopper rotating therewith and arranged to cooperate with a stationary scraper, in such manner that refuse falling into said pan or hopper is automatically and continuously cleared from its surface and directed to the aforesaid or other suitable refuse conveyor; while, at the same time, the spent water from the sprays is caught by the pan or hopper and discharged therefrom separately from the refuse. This water, already freed from coarser refuse, may be easily and quickly freed from dirt particles and the like by filtration or otherwise for re-circulation to the sprays; or, where water conservation is not of practical importance, it may be discharged to the sewer without objectionable results.

It is because of this arrangement of the pan with provision for discharging loose leaves and other refuse into disposal means separate from the water discharge, that it becomes practical to use a relatively coarsely apertured grid table top which permits practically all the refuse to fall through between its bars. This is in contradistinction to prior proposed types of apparatus, wherein perforated or screen table tops were employed which were designed to catch and hold back most of the refuse, but which quickly became so clogged as to prevent passage of the spray water therethrough, thus rendering the apparatus inoperative until shut down and cleaned out; or wherein there was employed, in conjunction with a coarsely apertured grid, a depending hopper provided with a strainer bottom upon which refuse likewise collected and compacted rapidly to such an extent as to require frequent shut-down and cleaning out to keep the apparatus in running condition.

Another important feature of the invention, in its best embodiments, is the provision of a structural arrangement wherein the whole rotary packing table or wheel, consisting essentially of the substantially horizontal grid top carrying the depending pan or hopper rigidly secured thereto, is supported, adjacent its outer periphery only, by rollers or the like, while an upright shaft which extends through the central hub of the wheel unit compels rotation of the unit about a fixed axis without carrying any of its weight. This construction has notable advantages in the particular combination of parts here involved including, among others, those of simplicity, the ability to dispense with a vertical thrust bearing at a location entailing lubrication difficulties under practical operating conditions, and ready accessibility to the water discharge outlet of the pan.

An apparatus embodying the invention in its most advantageous form is illustrated in the accompanying drawings, in which Fig. 1 is a side elevation of a two-table unit, partly broken away;

Fig. 2 is a plan view of the same;

Fig. 3 an end elevation, looking toward the right hand end of the machine as illustrated in Figs. 1 and 2;

Fig. 4 is a detail view in plan of one of the rotary table or wheel units, partly broken away to show details of the pan or hopper member depending from the outer rim of the grid top member;

Fig. 5 is a vertical section on line 5—5 of Fig. 4, looking in the direction of the arrows;

Fig. 6 is a detail view in perspective of a single section of the grid top;

Fig. 7 is a perspective view, partly broken away and in section, further illustrating the construction of the wheel rim and depending pan or hopper, and the relation thereof to other parts; and Fig. 8 is a detail, in elevation.

Figure 1:
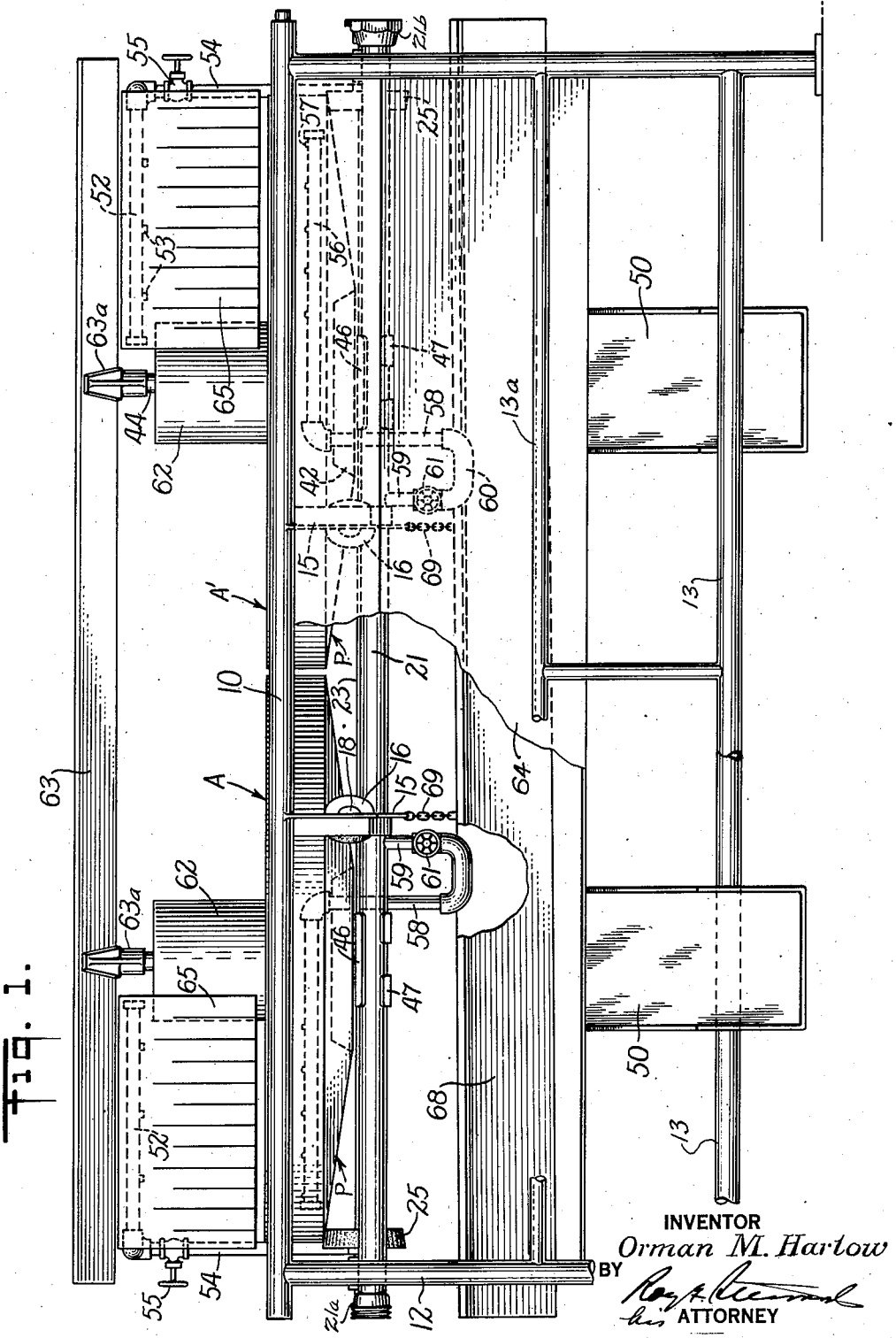

While the important features of the invention are advantageous in connection with an apparatus having only one rotary table, two such tables are frequently embodied in one framework to form a unit for supplying to a single packer, standing on one side of the unit, washed lettuce heads which have been trimmed and placed on the tables by one or more trimmers standing on the opposite side. Such an apparatus is therefore shown and will now be described.

Referring to the drawings, 10 indicates the side rails and 11 the end rails of a rectangular horizontal top frame, these members desirably being made of pipe connected by welding, though obviously other materials and other methods of connection may be employed if desired. Said top frame laterally overhangs and is supported by a lower framework comprising legs 12 connected by longitudinal members 13, 13a, and cross members 13b; the construction being further stiffened by diagonal braces 14, as shown in Fig. 3. From the side rails 10 depend transversely extending D-shaped hangers 15, advantageously of angle-iron, suitably attached to the side rails, as by welding. In the illustrated construction, there are two of these hangers, as shown in Fig. 1.

As shown in Fig. 5, each hanger 15 carries two anti-friction supporting rollers 16, each journaled in a slotted post 17 secured to the respective hanger 15, the said rollers being rotatably mounted on studs 18, adjustable vertically in the respective slotted posts and held in adjusted position by tightening nuts 19. The posts 17 may be mounted for lateral adjustment on the respective hangers 15, by means of slots in the base of each post and bolts 20 passing through said slots and through holes in the hanger. A pair of water-supply pipes indicated at 21, Figs. 1 and 3, extend lengthwise of the frame, these pipes resting on and being secured to the hangers 15.

Drive shaft 23, Figs. 2 and 3, extends longitudinally and centrally of the apparatus between pipes 21, this shaft being mounted in suitable journal boxes 24 secured to and supported by the hangers 15. The drive shaft carries two driving rollers 25, Fig. 2, fixed on the shaft, for frictionally driving the rotary table units, and also for providing part of the support therefor as will be explained hereinafter.

The framework thus far described is intended to support two rotary washing table or wheel units, indicated generally at A and A', Fig. 2, each table being supported at three peripheral points, spaced substantially 120° apart, by two of the anti-friction rollers 16 and one of the friction driving rollers 25, and also being constrained, by means to be described hereinafter, to rotate about a fixed vertical axis. As the rotary table units are alike in construction and operation, only one will be described in detail.

Each rotary table unit comprises a horizontally disposed grid top, indicated generally by G, together with a depending pan or hopper indicated generally by P, rigidly secured thereto and downwardly coned to a central outlet for discharging used spray water.

Referring first to the wheel-like grid top, this comprises an outer rim 26 circular in plan and of substantial width vertically, as indicated, connected by radial bars or spokes 27, four lengths of pipe in this instance spaced 90° apart, to a central hub here shown as formed by a pair of circular hub disks 28, 29, of differing diameters and provided with opposed concentric flanges 28a and 29a, apertured to receive the inner end portions of said spokes. Integral with hub disk 29 is a centering hub sleeve 30 braced by webs 31. The parts of the described assemblage, which constitutes a supporting spider, should be so secured together, for example by welding the outer ends of the spokes to rim 26 and their inner end portions to both flanges 28a, 29a, as to produce a rigid unitary structure. Into each of the four spaces left between adjacent spokes 27 in the specific arrangement here shown, is placed a grid section comprising an outer arcuate member 32, an inner arcuate member 33, and a plurality of radial rods 34, 35, extending between said arcuate members and rigidly secured to both. The radial rods 35 are longer than rods 34, it will be noted, extending inwardly beyond the inner arcuate member 33, so that their inner end portions 36 rest in notches 37 provided in the upper edge of hub disk flange 28a. This arrangement serves to support the grid section at its inner end. To support the outer end of each grid section, the inner face of the pan rim 26 is provided with projections 38 on which rest the lower edges of the outer arcuate members 32. These lower edges may be notched to engage said projections, if desired.

The downwardly coned bottom 39 of the depending pan or hopper is attached to the grid-top by suitable means, here shown as comprising a flange 40 extending upward from its outer margin and welded or otherwise rigidly secured to the outer rim 26 of the grid-top. Such sole supporting provision leaves the pan bottom wholly unobstructed for effective functioning of the refuse-removing means to be presently described. The pan bottom slopes downwardly to a central water discharge outlet 41, from the circular margin of which a screen or strainer 42 extends upwardly and, most advantageously, some distance inwardly over the outlet. The pan is also provided with a slot-like refuse-discharge opening 43 which extends from a point adjacent the rim 26 nearly to the base of strainer 42, or across a major portion of the annular pan bottom.

For constraining the washing table structure or unit to rotate about a fixed and substantially vertical axis, suitable stationary upright centering means are provided, said means being suitably carried by the apparatus frame and extending upward through the central opening in the pan and the hub of the grid-top. Upright post or stub shaft 44, passing through water outlet 41 and hub sleeve 30, is carried by a base or pedestal comprising a socket member 45 in which the lower end of the post is fixed, and a saddle block 46 which is integral or otherwise mechanically rigid with said socket member, and which rests upon and is secured to the two water-supply pipes 21. To this end the saddle block may be provided on its under side with two longitudinal grooves to fit the pipes and may be held down by clamp plates 47 suitably secured to the block by machine screws (not shown) or otherwise.

The socket sleeve 45 extends upwardly through the central opening of the pan bottom to a level higher than the upper edge of the circular screen 42, and has a lateral socket in which is rigidly held the end of a stationary scraper-arm 48 extending radially outward nearly to the rim 26 of the pan. This radial arm carries a scraper blade 49 which is sloped toward the advancing surface of the pan bottom, as shown, and is of such shape and generally radial extent that its working edge 49b is in effective scraping relation to the annular pan bottom across the entire width thereof and presents a lower corner 49a which just clears the base of strainer 42. Therefore, with the table unit rotating about its vertical axis in the direction of the arrow (Fig. 7), the stationary scraper blade removes from the pan bottom any refuse that falls thereon and holds it until continued rotation of the pan brings the refuse-discharge slot or opening 43 under the blade. Thereupon, the refuse drops through said slot and is directed to the aforesaid refuse conveyor by means that will be referred to presently. Since the pan is thus cleared of refuse at each revolution, there is little opportunity for refuse falling thereon to work downwardly to and build up on the central strainer 42 in such manner as to obstruct free discharge of wash water through central outlet 41. The downward coning or slope of the pan toward that inlet is so relatively slight, most desirably, as not greatly to favor any tendency of refuse falling into the pan to work toward the center. Moreover, arranging the lower working edge 49b at angle to the pan radius, with the corner 49a leading, any refuse that occasionally may reach the base of strainer 42 is effectively dug out of the angle between it and the pan bottom by said leading corner and worked outwardly by edge 49b so that it will be certain to fall through the discharge opening 43. Obviously, the shape of the scraper blade may be such, if desired, that its inner end edge will work close to the surface of strainer 42 to act as further refuse-clearing means; and, in order to further minimize any tendency of refuse to work toward the pan axis, the pan may be constructed with its bottom horizontal. But the construction illustrated works well and has certain practical advantages from a structural standpoint.

As shown, provision is made to direct water sprays from both above and below upon the lettuce or other produce as it rests on the coarsely apertured top of the rotation table unit. Above each said unit, at a suitable distance above the grid-top, an upper spray pipe 52 extends from outside the rim of the table toward the center thereof, this spray pipe having downwardly directed spray openings or nozzles 53 on its under side. Spray pipe 52 is supported by a vertical riser pipe 54 connected to one of the two longitudinal pipes 21, and is provided with a suitable control valve 55. Below the grid-top and above the pan bottom, a suitable spray device is provided to project a curtain spray of water upwardly through the grid-top from below. In the present construction, this spray device comprises a radial pipe 56 which has a series of upwardly directed spray openings or nozzles 57. The spray pipe 56 is supported by a vertical pipe connection 58, which rises through the central opening in the pan bottom and, in turn, is connected to and rigidly supported by the other water-supply pipe 21 through pipe connections 59 and 60. To control the supply of water to the lower spray pipe 56, a suitable valve may be provided as indicated at 61.

The described upper and lower spray pipes are desirably arranged in about the same vertical plane in order to save space. By the use of separate pipes 21 for supplying the respective upper and lower spray pipes, the pressure with which each spray is applied may be separately regulated. For convenience in assembling a plurality of the double packing wheel or table units in series, each of the water supply pipes 21 may be threaded at one end as indicated at 21a, and provided with a coupling 21b at the other, and each of the longitudinal frame members 10 may have its opposite ends appropriately formed, as indicated at 10a, 10b, to provide a spigot and bell joint with the corresponding members of adjoining units as shown. Likewise, sprocket 70 on drive shaft 23, to which power is transmitted by a driving chain connection to a suitable motor, not shown, may desirably be one half of what is known as a chain and double sprocket coupling whereby the drive shafts of a number of table units may be joined in continuous series.

Carried by the hub structure 28, 29, is a centrally arranged cylindrical guard 62 which serves to keep any lettuce heads or the like, resting on the grid top, away from the center of the table. A so-called set-back tray 63 is provided above the table into which a packer may place such plant products as are not of suitable size to be put in the grades he is then packing. These "set-back" products are packed separately later. In the present example, the set-back tray extends lengthwise of the apparatus and rests on generally Y-shaped supporting brackets 63a carried by upward extensions of stub shafts or posts 44. As shown in Fig. 8, the shank 64a of each support may be formed as a socket to receive the end of such extension with an easy sliding fit. This facilitates quick mounting of the set-back tray in position, or removal thereof, as occasion demands.

Aprons or shields 64, of sheet metal or other suitable material, which may be suitably secured to and depend from hangers 15, extend along the entire length of the double table unit, on opposite sides thereof, and also inwardly underneath the unit, with their lower portions resting on longitudinal members 13a of the apparatus framework, and with their lower edges parallel to and overhanging the recessed floor conduit 51a. These aprons are useful in helping to prevent drip and splash of wash water from falling on the floor and around the operators' feet, by directing it downwardly into said conduit 51a. In the present example, one of these aprons 64 (the one shown at the right in Fig. 3) serves also as means for directing and discharging to endless traveling refuse conveyor 51, the refuse that is periodically dropped through discharge opening 43 of the rotary pan. Conveyor 51, which may be of the drag-link type, is arranged in conduit 51a to travel underneath and longitudinally of the double table unit shown, or a series of such units, and to deliver refuse to any convenient place of discharge or disposal.

In order to provide further protection against splashing of water from the apparatus, vertical flexible curtains 65 may be hung at each side of the upper spray pipes, these curtains being supported in any suitable manner as, for example, on rods 66 clamped to the respective upper spray pipes by detachable clamp devices 67. The curtains may be slitted, as indicated, to permit the passage of individual lettuce heads or other produce being carried around on the grid top or wheel. The spent wash or rinse water, falling into the pan or tray P from which it is discharged through central outlet 41, is received by suitable conduit means which either conveys it to a suitable sump or collecting tank for re-use after clarification by filtration or otherwise, or discharges it to the sewer. In the apparatus here illustrated, such conduit means is provided by a trough 68, which is adjustably supported, as by chains 69, in such manner that it may be inclined to discharge at either end, as may be desired.

In the specific apparatus here shown and described, the rotation of the two tables will be in opposite angular directions, and the spray pipes are located at opposite ends of the two-table apparatus. However, by shifting either of the two friction driving rollers 25 to the opposite side of its rotary unit, that is, near to the middle of the two-table apparatus, the two tables will rotate in the same angular direction. By shifting both of the said friction driving rollers 25 to the middle position, the tables will rotate in opposite angular directions relative to each other, but in a sense which is the reverse of the rotation obtained when the said driving wheels 25 are in the positions shown in the drawings. By the means provided, the direction of rotation of each table may be determined as desired. For convenience, the said friction driving-rollers 25 may be slidable along the central drive-shaft 23 when it is removed from its bearings. The said rollers 25 may be fixed to the shaft in any adjusted position thereon by suitable set-screw or other means (not shown) with which their respective hubs may be provided.

While the spray pipes are shown at opposite ends of the two-table apparatus, they may both be placed at the middle of the apparatus, or one at the outer end and one at the middle, by a suitable alteration in the pipe connections, as will be obvious to those skilled in the art. It will also be seen that the apparatus may be supplied with produce from either side of the machine, by a proper adjustment of the direction of angular movement, thereby readily adapting the apparatus to use under different packing house conditions.

It will be understood that trimmers work on one side of the machine and a packer on the other side; and the direction of angular movement of each table is such that the plant product, after being deposited on the table by a trimmer, will pass through the sprays before reaching the packer. Furthermore, the rotary tables of the double unit may turn in opposite angular directions, where one packer is caring for two tables; although, where there is one packer for each table, the tables may rotate in the same angular direction. In changing the direction of rotation of a table, the angle of the scraper 43 should be adjusted accordingly. This can be done by turning the scraper arm in its socket in the saddle block, where it may be held in adjusted position by a set screw, for example, in well known manner.

In the operation of the apparatus, the central drive-shaft 23 is rotated by a suitable motor, not shown, having appropriate driving connection to sprocket 70; while water is supplied under appropriate pressure to the two longitudinal pipes 21 by suitable pump means, not shown. Heads of lettuce or other produce as they come from the field are picked up by the trimmers, who trim off the coarse outer leaves and deposit them in the open refuse chutes or troughs 50 which carry them downwardly and discharge them to refuse conveyor 51. The trimmers' refuse chutes 50 are supported by side rail 10 and lower frame member 13 by hangers 50a and hooks 50b, respectively, in such manner that each chute may be moved longitudinally into adjusted position most convenient to the trimmers.

The trimmed lettuce heads (e. g.), placed on the tables by the trimmers on their side of the apparatus, are carried, by rotation of each table in the appropriate angular direction, through the washing sprays to the opposite side of the apparatus where the packer removes them and packs them, according to size, in crates close to him.

When heads of lettuce, cabbage or the like are placed by a trimmer on the rotary table, they may often carry loosely adhering trimmed-off outer leaves which escaped being thrown down the refuse chute by the trimmer. These will usually be dislodged by passage through the washing sprays, together with some others that may be accidentally broken off in the washing operation. The largest of such dislodged leaves may fail to pass through the openings of the grid top, and hence must be raked or lifted off the grid top by the operators. Owing to the radial arrangement of the bars of the grid top, such large leaves are easily raked or otherwise moved to the outer margin of the table and deposited in the refuse chute. Furthermore, because the spaces between said bars are relatively wide, that is, just small enough to retain the smaller marketable size of the plant products, most of the loose leaves and similar refuse fall between the bars into the tray and onto its bottom. By the rotation of the tray, the refuse is carried around until it encounters the stationary scraper 49, which is positioned to extend over one or the other of the aprons or shields 64; in this instance, the one shown at the right in Fig. 3. Said scraper accumulates refuse and detains it until the refuse discharge opening 43 in the tray bottom comes underneath the scraper; whereupon the accumulated refuse falls through said opening and against the apron or shield 64 therebelow, which directs it downwardly upon the endless conveyor 51 to be carried away to any convenient place of refuse discharge.

One of the important advantages of properly spacing the radial bars forming the grid-top of the tray in accordance with the present invention is that the cut stem of even a large lettuce head may enter between said bars at even the narrowest space between them, so that the trimmers may place a head of lettuce on the grid top with the butt or stem-end down, and the head will remain in this position while traveling through the sprays and until it arrives at the packer's stand on the other side of the unit. As such heads are packed in shipping crates with the butts down, the heads so placed on the table thus arrive, after being washed, in proper position to be rapidly grasped and placed in the crate by the packer, thereby enabling more rapid packing. In employing the washing tables heretofore known, the heads frequently roll and alter their positions on the table, so that the packer must consider each head as he picks it up in order to determine whether or not it is to be turned over or around before it is put in place in a crate.

While the spacing of the radial bars may vary somewhat, it has been found that if the minimum distance between any two bars is not less than about one inch and the maximum distance is not greater than about two inches, the apparatus will be satisfactory for use with lettuce of the usual market sizes. Of course, for heads of the larger plant products, such as cabbage, the maximum size of the stem will determine the minimum spacing, which is at the inner ends of the grid bars and, where the bars are radial, the diameter of the tray will determine the maximum spacing at the margin of the tray and elsewhere.

When it is desired to thoroughly clean the pan, it is only necessary to remove the grid-top to obtain free access to the pan-bottom and the parts within the pan. By making the grid-top in sections, each section is light enough to be lifted out readily without much effort, yet by the arrangement provided said sections are securely held against lateral or angular displacement.

If for any reason it should be desired to omit the splash aprons 64, or at least that one upon which refuse is periodically discharged through refuse-discharge opening 43 of the pan P as it rotates, any suitable means may be substituted for directing the discharged refuse down into the floor recess or conduit 51a for removal by draglink conveyor 51. For example, trimmer's chute 50 may be employed for this purpose, and thus serve in a dual capacity. In such case, said chute and the scraper device 48—49 must be so positioned relative to each other that the refuse so discharged will fall into said chute and by it be directed down into the floor recess for removal by the conveyor as aforesaid. In the specific construction and arrangement here illustrated, no position adjustment of either the scraper device or the trimmer's chute is required to effect this cooperative relationship, since the scraper device extends outwardly at right angles to the longitudinal axis of the apparatus, while the trimmer's chute is located directly therebelow in position to receive the discharged refuse in the absence of the intervening splash apron (Figs. 2, 3, 5).

It will be understood by those skilled in the art that when a plurality of two-table machines are employed in a packing plant, with the machines placed end to end, the longitudinal water-pipes will be coupled together to provide two continuous water-lines, supplied, if desired, by one pump.

What is claimed is:

1. Apparatus for washing produce which comprises a table structure mounted for rotation about an upright axis, means for effecting such rotation, and means for spraying water against produce carried by said table structure; said table structure comprising a produce-supporting top adapted to retain thereon the produce being sprayed but being so coarsely apertured as to favor passage therethrough of even the coarsest refuse that may be detached in such spraying, and a pan disposed below and attached to said top, said pan being provided with separate discharge outlets for water and refuse, respectively; together with provision for preventing exit of refuse through the water-discharge outlet, and means operative upon rotation of the table structure to direct refuse to the refuse-discharge outlet.

2. Apparatus for washing produce comprising, in combination, a rotatable table structure which includes an annular pan surmounted by a coarsely apertured produce-supporting top, and having a central water-discharge opening, a strainer guarding the same, and a refuse-discharge opening extending transversely of the annular pan bottom intermediate said strainer and the pan periphery, said top having a centering hub axially aligned with said water-discharge opening; supporting means upon which said rotatable table structure is mounted for rotation about an upright axis, and means for effecting such rotation; stationary upright means extending through said aligned water-discharge opening and centering hub and engaging the latter to determine the rotation axis of the table structure; a scraper device carried by said stationary upright means and extending outwardly therefrom, between the produce-supporting top and the pan bottom, across and in cooperative relation with said bottom and the refuse-discharge opening therein; and means for spraying water against produce supported on said top; together with means for separately conducting away the water and the refuse discharged from said pan as the table structure rotates.

3. Apparatus for washing produce which comprises, in combination, a table structure mounted for rotation about an upright axis, means for effecting such rotation, and means for spraying water against produce carried by said table structure; said table structure comprising a produce-supporting grid-top and a pan disposed therebelow and attached thereto, the bottom of said pan sloping downwardly to a central water-discharge opening and being provided with a transversely extending refuse-discharge opening, provision being also made for separating refuse from the water before it can exit through said water-discharge opening; stationary upright means disposed centrally of said table structure and constraining it to rotate about said upright axis; a scraper device carried by said stationary upright means and extending outwardly between the grid-top and the pan bottom, in cooperative relation with the latter and its refuse-discharge opening aforesaid; and spray piping arranged to direct wash water against produce carried by said grid-top; together with means for separately conducting away the water and the refuse discharged from said pan as the table structure rotates.

4. Apparatus for washing produce comprising, in combination, a rotatable table structure which includes a substantially horizontal produce-supporting circular grid-top having a central hub, a pan disposed below said grid-top, and an outer rim connecting said grid-top and pan, the bottom of said pan sloping downwardly to a central water-discharge opening guarded by a strainer, and being provided with a refuse-discharge opening extending transversely intermediate said rim and said water-discharge opening; means for rotatably supporting said table structure and for rotating the same; stationary upright means disposed centrally of said table structure, including a centering post extending through said water-discharge opening and also through and in guiding engagement with said central hub; a scraper device carried below said grid-top by said stationary upright means and extending outwardly over said strainer toward said rim, in cooperative relation with the pan bottom and its refuse-discharge opening aforesaid; and a system of spray pipes arranged to direct wash water from both above and below said grid-top against produce carried thereon; together with means for separately conducting away the water and the refuse discharged from said pan as this table structure rotates.

5. Apparatus as set forth in claim 4, wherein said grid-top comprises a plurality of radially disposed produce-supporting bars spaced apart sufficiently to allow passage of loose leaves and other refuse to the pan below, while retaining the produce.

6. In apparatus for washing and packing produce, a rotatable table structure comprising a pan and a produce-supporting grid-top, and an outer rim connecting the same, said grid-top comprising a series of supporting rods secured to said rim and extending radially inward, a central ring secured to said supporting rods at their inner ends, a series of removable grid-sections each having a substantially arcuate outer member, a substantially arcuate inner member, and a series of radial bars extending from the outer member to the inner member and secured to both, some of said radial bars extending inward beyond the inner member far enough to engage and be supported by the central ring, and means carried by said rim for supporting the arcuate outer members; said grid-sections occupying the spaces between the supporting rods and forming therewith the complete grid-top for the pan.

7. In apparatus for washing and packing produce, the rotatable table structure set forth in claim 6, wherein any two adjacent radial members of the grid-top are spaced apart not less than one inch and not more than about two inches.

8. Apparatus as set forth in claim 2, which includes a refuse conveyor located at a lower level than said pan, means disposed below said pan and in proper refuse-receiving alignment with said scraper device, adapted and arranged to direct to said conveyor refuse discharged from said pan; and a water-disposal conduit positioned under and close to said water-discharge opening.

9. Apparatus as set forth in claim 2, which includes a refuse conveyor located a substantial distance below said pan, a splash apron mounted adjacent one side of the table structure and extending underneath the same sufficiently far to deflect to said conveyor refuse discharged from said pan.

10. Apparatus as set forth in claim 2, which includes a refuse conveyor located a substantial distance below said pan, a trimmer's chute extending from a point adjacent the produce-supporting top to a point of delivery over said conveyor, said chute being also positioned to receive refuse discharged from said pan through said refuse-discharge opening and deliver it to the conveyor.

11. Apparatus for washing produce which comprises the combination, with a supporting frame, of a pair of hangers extending transversely between and secured to opposite side members of said frame, longitudinally extending water supply piping supported by and secured to said hangers, a longitudinally extending horizontal drive shaft journaled on said hangers centrally thereof, a pair of driving rollers secured to said shaft and spaced apart thereon, supporting rollers mounted on said hangers on opposite sides of said shaft and spaced away therefrom a substantial distance, a pair of upright centering posts mounted in spaced relation on said water supply piping between said hangers and vertically above said drive shaft, a pair of circular washing tables provided with hubs through each of which passes one of said centering posts, each table being supported by at least two of said supporting rollers and being operatively engaged by one of said driving rollers, and spray pipes connected to said water supply piping for spraying water on produce carried by said tables.

ORMAN M. HARLOW.

REFERENCES CITED

The following references are of record in the file of this patent:

UNITED STATES PATENTS

| Number | Name | Date |
|---|---|---|
| 950,753 | Noland | Mar. 1, 1910 |
| 1,384,379 | Bost et al. | July 12, 1921 |
| 1,765,647 | Boehnke | June 24, 1930 |
| 2,127,270 | Schaaf | Aug. 16, 1938 |
| 2,197,978 | Hoon | Apr. 23, 1940 |
| 2,292,240 | Platt et al. | Aug. 4, 1942 |